United States Patent
Oh et al.

(10) Patent No.: US 8,893,942 B2
(45) Date of Patent: Nov. 25, 2014

(54) APPARATUS FOR CORRECTING BELT-MEANDERING FOR SECONDARY BATTERY

(75) Inventors: Dae-Sik Oh, Yongin-si (KR); Keon-Soo Bae, Yongin-si (KR); Gi-Bong Cho, Yongin-si (KR); Sung-Jea Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 722 days.

(21) Appl. No.: 13/181,415

(22) Filed: Jul. 12, 2011

(65) Prior Publication Data

US 2012/0043408 A1 Feb. 23, 2012

(30) Foreign Application Priority Data

Aug. 19, 2010 (KR) ........................ 10-2010-0080293

(51) Int. Cl.
*B65H 23/032* (2006.01)
*H01M 10/04* (2006.01)

(52) U.S. Cl.
CPC ............ *H01M 10/0409* (2013.01); *Y02E 60/12* (2013.01)
USPC ........................................................ 226/19

(58) Field of Classification Search
CPC ...... B65H 20/02; B65H 20/04; B65H 23/038; B65H 2553/46; B65H 2515/842; B65H 2557/51
USPC .................................................... 226/19, 20
See application file for complete search history.

(56) References Cited

U.S. PATENT DOCUMENTS

| | | | |
|---|---|---|---|
| 6,059,285 A | 5/2000 | Suga et al. | |
| 2011/0111329 A1 | 5/2011 | Tazoe | |

FOREIGN PATENT DOCUMENTS

| | | | |
|---|---|---|---|
| JP | 09-221252 A | 8/1997 |
| JP | 10-175752 A | 6/1998 |
| JP | 2002-093408 A | 3/2002 |
| JP | 2005-079079 A | 3/2005 |
| JP | 2005-116492 A | 4/2005 |
| JP | 2007-161474 A | 6/2007 |
| JP | 2008-063150 A | 3/2008 |
| JP | 2009-132524 A | 6/2009 |
| WO | WO 2009/019781 A1 | 2/2009 |
| WO | WO 2009125298 A2 * | 10/2009 |
| WO | WO 2010/010705 A1 | 1/2010 |

OTHER PUBLICATIONS

Machine Translation of WO 2009/019781 A1, Feb. 12, 2009.*
Chinese Office Action dated Dec. 16, 2013 for Chinese Patent Application No. CN 201110234338.X which shares priority of Korean Patent Application No. KR 10-2010-0080293 with captioned U.S. Appl. No. 13/181,415, and cites the above-identified references numbered 1-3.

* cited by examiner

*Primary Examiner* — William E Dondero
(74) *Attorney, Agent, or Firm* — Knobbe, Martens, Olson & Bear, LLP

(57) ABSTRACT

An apparatus of correcting belt-meandering for a secondary battery is disclosed. In one embodiment, the apparatus includes i) upper and lower rollers configured to receive a base material therebetween, wherein the base material comprises positive and negative electrode materials and an insulating material interposed between the electrode materials and ii) a driver portion configured to rotate the upper and lower rollers such that the base material is transferred in a first direction during the rotation. The apparatus may also include i) a support portion configured to support shafts of the driver portion and the upper and lower rollers and ii) a transverse moving mechanism configured to move the support portion in a second direction substantially perpendicular to the first direction.

18 Claims, 3 Drawing Sheets

APPARATUS FOR CORRECTING BELT-MEANDERING FOR SECONDARY BATTERY

RELATED APPLICATIONS

This application claims priority to and the benefit of Korean Patent Application No. 10-2010-0080293, filed on Aug. 19, 2010, in the Korean Intellectual Property Office, the entire content of which is incorporated herein by reference.

BACKGROUND

1. Field

The described technology generally relates to an apparatus for correcting a belt-meandering for a secondary battery, and more particularly, to an apparatus that precisely corrects the meandering of a jelly roll wound at a high speed in a winding operation for a secondary battery.

2. Description of the Related Technology

A secondary battery is manufactured by winding, at a high speed, a positive electrode collector coated with a positive electrode active material, a negative electrode collector coated with a negative electrode active material, and an insulation film for insulating the two collectors from each other. According to a winding method in such a configuration, the winding of a base material including positive/negative electrode materials and two insulation films is performed by repeatedly performing stopping/winding with respect to a roller at a high speed.

In this instance, a meandering in a direction vertical to a transfer direction may be generated during the transfer of the base material according to a possible unequal coating of the positive/negative electrode materials, the vibration in winding or the degree of equipment. Such a meandering phenomenon causes a winding failure, and therefore, the quality of a final battery product generally degrades.

SUMMARY

One inventive aspect is an apparatus for correcting belt-meandering, which can minimize stresses applied to a base material transferred at a high speed through a simple configuration.

Another aspect is an apparatus for correcting belt-meandering, which can precisely control meandering.

Another aspect is an apparatus for correcting belt-meandering, the apparatus including a driver portion, upper and lower rollers, a support portion and a transverse moving mechanism. The upper and lower rollers transfers a base material while being rotated by receiving a rotation force provided from the driving portion. The support portion supports rotation shafts of the driving portion and the upper and lower rollers. The transverse moving mechanism moves the support portion in a direction perpendicular to a transfer direction of the base material.

The apparatus may further include a meandering sensor and a control portion. The meandering sensor senses a meandering of the base material. When the meandering sensor senses the meandering of the base material, the control portion controls the transverse moving mechanism to move the support portion in a direction in which the meandering of the base material is corrected.

When the meandering sensor no longer senses the meandering of the base material, the control portion may stop the transverse moving mechanism.

The transverse moving mechanism may be provided with an electric motor controlled by the control portion and a ball-screw type moving mechanism that converts the rotation of the electric motor into a linear motion.

The meandering sensor may be provided at an entry side of the upper and lower rollers.

The upper and lower rollers may be subjected to surface treatment for increasing a frictional coefficient.

A material with a high frictional coefficient may be coated on outer circumferential surfaces of the upper and lower rollers.

The apparatus may further include an air pressure cylinder that controls pressure applied to the base material by the upper and lower rollers.

The apparatus may further include a wrinkle sensing portion. The wrinkle sensing portion senses a wrinkle on the base material transferred by the upper and lower rollers. When a wrinkle is sensed, the control portion controls the pressure control cylinder for a certain period of time so that the pressure applied to the base material by the upper and lower rollers is decreased.

The wrinkle sensing portion may be provided at an entry side of the upper and lower rollers.

The wrinkle sensing portion may include a pulse laser transmitter that irradiates laser and a receiving sensor that receives the laser irradiated from the pulse laser transmitter.

The base material transferred by the upper and lower rollers may be an electrode plate. Another aspect is an apparatus for correcting a belt-meandering of a jelly roll wound at a high speed in a winding operation for a secondary battery, the apparatus comprising: upper and lower rollers configured to receive a base material therebetween, wherein the base material comprises positive and negative electrode materials and an insulating material interposed between the electrode materials; a driver portion configured to rotate the upper and lower rollers such that the base material is transferred in a first direction during the rotation; a support portion configured to support shafts of the driver portion and the upper and lower rollers; and a transverse moving mechanism configured to move the support portion in a second direction substantially perpendicular to the first direction.

The above apparatus further comprises: a meandering sensor configured to detect a meandering of the base material; and a control portion configured to control the transverse moving mechanism based on the detected meandering to move the support portion in a direction in which the meandering of the base material is at least partially corrected. In the above apparatus, the control portion is configured to stop the transverse moving mechanism when no meandering of the base material is detected.

In the above apparatus, the transverse moving mechanism comprises an electric motor controlled by the control portion and a ball-screw type moving mechanism configured to convert the rotation of the electric motor into a substantially linear motion.

In the above apparatus, the meandering sensor is located adjacent to an entry side of the upper and lower rollers where the base material is received. In the above apparatus, the meandering sensor is configured to detect i) an occurrence of the meandering, ii) the direction of the meandering and iii) the degree of the meandering, and wherein the control portion is configured to control the transverse moving mechanism so as to move the support portion by the meandering degree in the opposite direction to the detected meandering direction.

In the above apparatus, the meandering sensor is configured to detect i) an occurrence of the meandering and ii) the direction of the meandering, and wherein the control portion is configured to control the transverse moving mechanism based on the detected meandering direction so as to move the support portion in a direction in which the meandering is at least partially corrected. In the above apparatus, at least one of the upper and lower rollers has an outer surface treated so as to increase its frictional coefficient.

In the above apparatus, a material having a high frictional coefficient is coated on outer circumferential surfaces of the upper and lower rollers. The above apparatus further comprises an air pressure cylinder configured to control pressure applied to the base material by the upper and lower rollers. The above apparatus further comprises at least one wrinkle sensor configured to detect a wrinkle on the base material during the rotation, wherein the control portion is configured to control the pressure cylinder based on the detected winkle for a certain period of time so as to decrease the pressure applied to the base material by the upper and lower rollers.

In the above apparatus, the wrinkle sensor is located adjacent to an entry side of the upper and lower rollers where the base material is received. In the above apparatus, the wrinkle sensor comprises a pulse laser transmitter configured to irradiate laser and a receiving sensor configured to receive the laser irradiated from the pulse laser transmitter.

Another aspect is an apparatus for correcting meandering of a base material while being transferred, the apparatus comprising: first and second rollers adjacent to each other and configured to receive the base material therebetween; a driver configured to rotate the rollers such that the base material is transferred in a first direction during the rotation; and a transverse moving mechanism configured to move the rollers in a second direction substantially perpendicular to the first direction.

The above apparatus is configured to correct a meandering of a jelly roll wound at a high speed in a winding operation for a secondary battery, and wherein the base material comprises positive and negative electrode materials and an insulating material interposed between the electrode materials.

The above apparatus further comprises a support structure accommodating shafts of the driver portion and the rollers, wherein the transverse moving mechanism is further configured to move the support structure in the second direction. The above apparatus further comprises: a meandering sensor configured to detect a meandering of the base material; and a controller configured to control the transverse moving mechanism based on the detected meandering to move the support portion in a direction in which the meandering of the base material is at least partially corrected.

In the above apparatus, the meandering sensor is configured to detect i) an occurrence of the meandering, ii) the direction of the meandering and iii) the degree of the meandering, and wherein the control portion is configured to control the transverse moving mechanism so as to move the support portion by the meandering degree in the opposite direction to the detected meandering direction.

Another aspect is an apparatus for correcting meandering of a base material while being transferred, the apparatus comprising: first and second rollers adjacent to each other and configured to receive the base material therebetween; a driver configured to rotate the rollers such that the base material is transferred in a first direction during the rotation; a transverse moving mechanism configured to move the rollers in a second direction substantially perpendicular to the first direction; means for detecting at least one of 1) a meandering of the base material and 2) a wrinkle on the base material; and a controller configured to control the transverse moving mechanism based on the detection so as to move the rollers in a direction in which at least one of the meandering and wrinkle of the base material is at least partially corrected.

In the above apparatus, the detecting means comprise: a meandering sensor configured to detect a meandering of the base material during the rotation; and a wrinkle sensor configured to detect a wrinkle on the base material during the rotation, wherein the meandering sensor and wrinkle sensor are located on opposite sides of the rollers.

DETAILED DESCRIPTION

Figure 1:
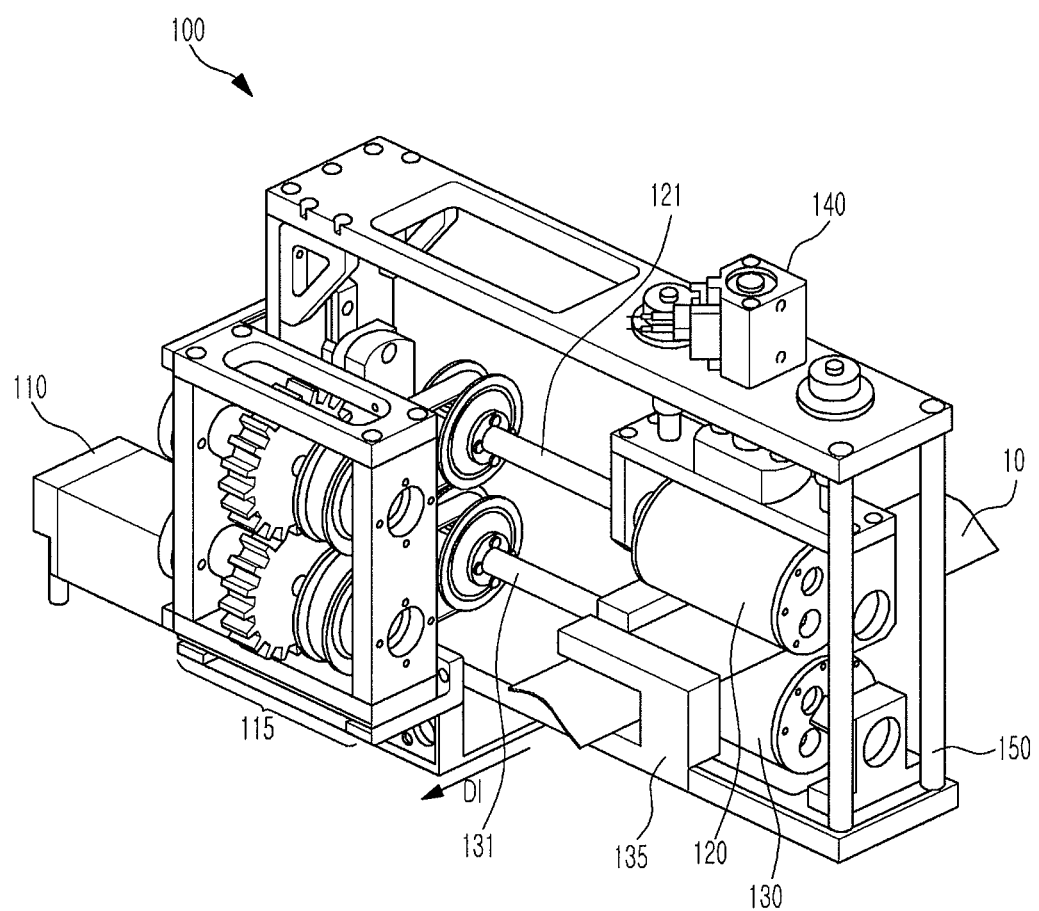
FIG. 1 is a perspective view of an apparatus of correcting belt-meandering according to an embodiment.

Generally, a belt-meandering of a jelly roll of a secondary battery is controlled in a manner that a base material is correctly transferred by applying a constant pressure to the base material using a transverse moving motor based on a correction value read by a sensor for sensing a meandering. In such a meandering control method, when the transfer speed of a base material is slow, the stress applied to the base material is low, and therefore, it is unlikely that a wrinkle or the like is generated on the base material. However, in a case where the base material is transferred at a high speed, a constant pressure is applied to the base material in a direction substantially vertical to the transfer speed of the base material, and therefore, wrinkles are frequently generated. Further, when winding is initially performed, i.e., when the base material is stopped and then transferred at a high speed, tension is rapidly increased by upper/lower rollers as applied to the base material, which likely adversely affects a subsequent process.

Embodiments will be described with reference to the accompanying drawings, which are illustrative in nature and not restrictive. In addition, when an element is referred to as being "on" another element, it can be directly on that element or be indirectly on the element with one or more intervening elements interposed therebetween. Also, when an element is referred to as being "connected to" another element, it can be directly or indirectly connected to that element. Hereinafter, like reference numerals refer to like elements. In the drawings, the thickness or size of layers may be exaggerated for clarity and not necessarily drawn to scale.

Electrode assemblies used in secondary batteries may be classified into, for example, a winding-type electrode assembly and a stacking-type electrode assembly. The winding-type electrode assembly is formed by winding long sheet-shaped positive and negative electrode plates insulated by a separator. The positive electrode plate, the negative electrode plate and the separator, which are wound as described above, are called as an electrode plate. The electrode plate includes a positive electrode collector coated with a positive electrode active material, a negative electrode collector coated with a negative electrode active material, and an insulation film for insulating the two collectors from each other. Hereinafter, the electrode plate is referred to as a base material for the convenience of description.

First Embodiment

Figure 2:
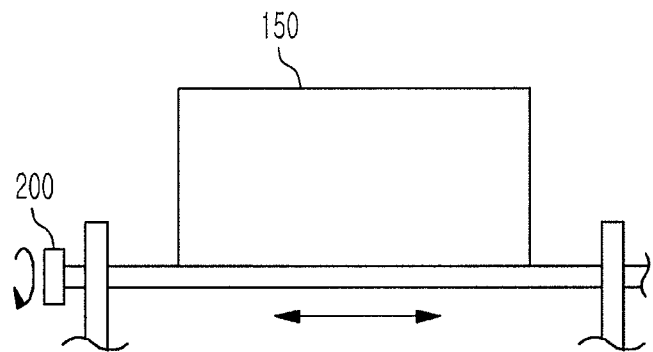
FIG. 2 is a schematic view illustrating a transverse moving mechanism according to an embodiment.

Referring to FIGS. 1 and 2, the apparatus 100 of correcting belt-meandering includes a driver portion 110, upper and lower rollers 120 and 130, a support portion (or a support structure) 150 and a transverse moving mechanism 200. Hereinafter, each of the components will be described in detail. In one embodiment, the base material is an electrode plate for a secondary battery. The base material may be used for a device other than a secondary battery and include a sheet or a plate being transferred by rollers.

The driver portion 110 drives the apparatus 100 by converting electric energy into rotational kinetic energy. The driver portion 110 provides a driving force to a gear portion 115 through a rotation shaft. The gear portion 115 provides a rotation force to a first rotation shaft 121 to which the upper roller 120 is fixed and a second rotation shaft 131 to which the lower roller 130 is fixed, which will be described later, using gears and various types of belt pulleys. In one embodiment, the driver portion 110 rotates the first and second rotation shafts 121 and 131 reversely with respect to each other using a spur gear or the like. The gear portion 115 may be configured using various gears, belt pulleys, timing belts and the like, but they are all referred to as a gear portion for convenience of description.

The upper and lower rollers 120 and 130 align and transfer a base material 10 that enters between the two rollers while being rotated in reverse directions to each other. In this instance, the upper roller 120 is connected to the first rotation shaft 121 rotated by the driver portion 110, and the lower roller 130 is connected to the second rotation shaft 131 rotated by the driver portion 110.

Meanwhile, the frictional force of the upper and lower rollers 120 and 130 may be increased so that the base material 10 is effectively transferred. The surfaces of the upper and lower rollers 120 and 130 may be properly treated so as to increase the frictional force. In addition, the frictional force generated between the upper roller 120 and/or lower roller 130 and base material 10 may be increased by coating a material with a high frictional coefficient on the outer circumferential surfaces of the upper and lower rollers 120 and 130.

The support portion 150 constitutes a body of the apparatus 100. The support portion 150 supports the driver portion 110, the gear portion including a driving shaft, the first rotation shaft 121 to which the upper roller 120 is fixed, and the second rotation shaft 131 to which the lower roller 130 is fixed.

Referring to FIGS. 1 and 2, the transverse moving mechanism 200 moves the support portion 150 in a direction substantially perpendicular to the transfer direction D1 (FIG. 1) of the base material 10. The transverse moving mechanism 200 may be implemented by installing separate guide rails or by using an air or oil pressure cylinder. However, a ball-screw type moving mechanism for converting a rotation motion into a rectilinear motion may be used to perform a precise movement.

Figure 3:
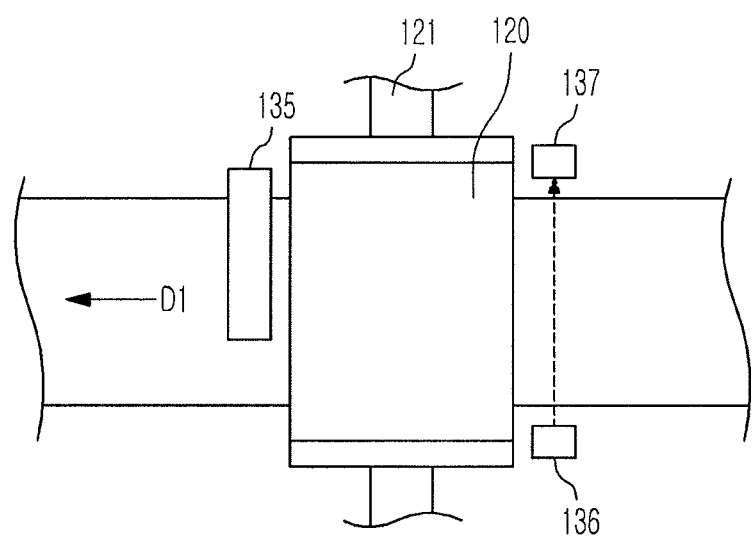
FIG. 3 is a schematic view illustrating positions at which a meandering sensor and a wrinkle sensing portion are provided, respectively.
Figure 4:
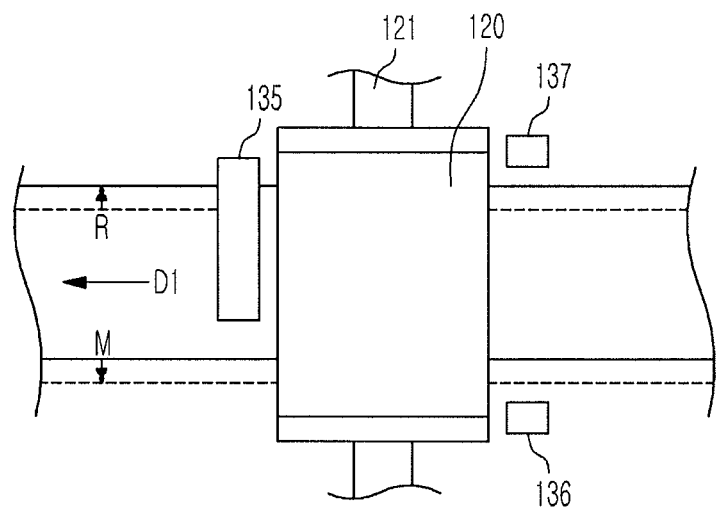
FIG. 4 is a schematic view illustrating a state that meandering of a base material is generated.

Referring to FIGS. 3 and 4, a meandering sensor 135 senses a meandering while the base material 10 is transferred. The meandering sensor 135 may be provided at an entry side of the upper and lower rollers 120 and 130. As shown in FIG. 4, while the base material 10 is transferred, a meandering M in a direction substantially vertical to a transfer direction may occur during the transfer of the base material 10 due to a possible unequal coating of the positive/negative electrode materials, vibration in winding process or the quality of equipment. In this case, the meandering sensor 135 senses the meandering M and provides the meandering M as an electrical signal to a control portion (or a controller) 300 (FIG. 5) which will be described later.

Referring to FIG. 1, a pressure control cylinder 140 controls the pressure applied to the base material 10 by the upper and lower rollers 120 and 130. The pressure control cylinder 140 controls the high and low of the first rotation shaft 121 to which the upper roller 120 is fixed by using an air or oil pressure cylinder. Although the air or oil pressure cylinder is used to simplify the configuration of the apparatus 100, it is not limited thereto. That is, the air or oil pressure cylinder may be replaced by a high and low controlling mechanism using various methods.

Figure 5:
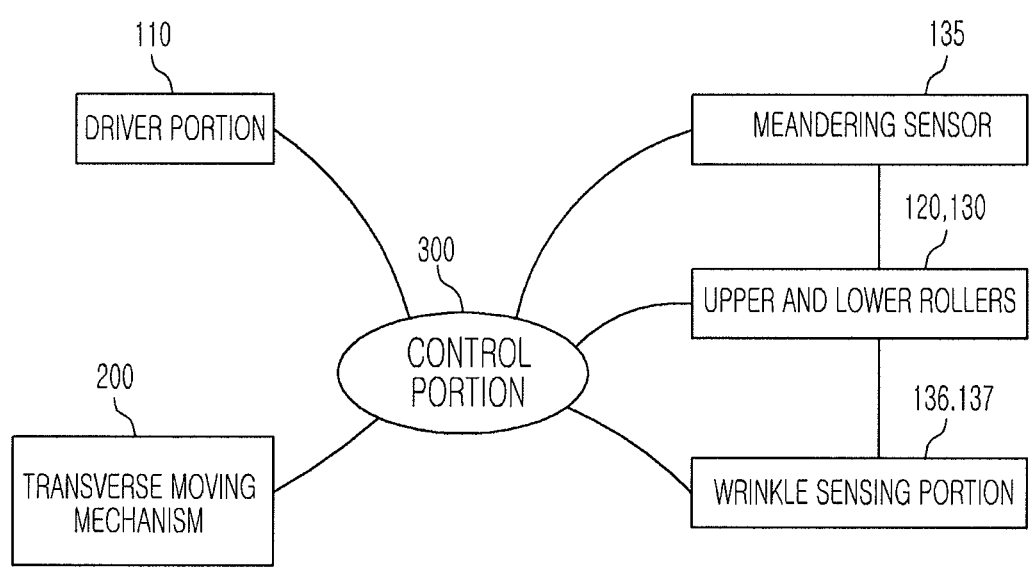
FIG. 5 is a block diagram of an apparatus of correcting belt-meandering according to an embodiment.

In one embodiment, as shown in FIG. 5, the control portion 300 controls the transverse moving mechanism 200 based on a sensing signal, including the generation of a meandering, detected by the meandering sensor 135.

In one embodiment, the control portion 300 continuously receives the sensing signal from the meandering sensor 135, while the base material 10 is transferred. The sensing signal may include information about generation of the meandering, the generation direction of the meandering and the generation degree of the meandering. The control portion 300 may control, based on the sensing signal, the transverse moving mechanism 200 to be moved in the direction in which the meandering provided from the meandering sensor 135 is corrected. For example, the control portion 300 controls the transverse moving mechanism 200 to move the support portion 150 by the generation degree of the meandering in the opposite direction to the generation direction of the meandering.

Second Embodiment

Another embodiment will be described with reference to FIG. 4. This embodiment relates to a case where the meandering sensor 135 does not provide the generation degree of a meandering to the control portion 300. That is, the meandering sensor 135 provides only information about generation of the meandering and the generation direction of the meandering to the control portion 300. In this case, if the control portion 300 controls the transverse moving mechanism 200 to be moved in the direction R in which the meandering is corrected, the entire support portion 150 including the upper and lower rollers 120 and 130 are moved in the corrected direction R (FIG. 4). If the base material 10 is returned to a normal position while the meandering sensor 135 continuously monitors the position of the base material 10, the meandering sensor 130 no longer provides information about the presence of the meandering to the control portion 300. Then, the control portion 300 stops the position control of the transverse moving mechanism 200.

Third Embodiment

Yet another embodiment will be described with reference to FIG. 3. Each of wrinkle sensing portions (or at least one wrinkle sensor) 136 and 137 senses a wrinkle generated on the transferred base material 10. In this embodiment, each of the wrinkle sensing portions 136 and 137 includes a pulse laser transmitter (e.g., 136) that irradiates with a laser and has a receiving sensor (e.g., 137) that receives the laser irradiated from the pulse laser transmitter 136. In this instance, a plurality of transmitters 136 are provided according to the height of the base material 10, and a plurality of receiving sensors 137 are provided as many as the number of the transmitters 136. In a case where no wrinkle is generated on the base material 10, the laser beam normally reaches the plurality of receiving sensors 137. In a case where a wrinkle is generated on the base material 10, the laser does not reach the plurality of receiving sensors 137.

Meanwhile, as shown in FIG. 3, each of the wrinkle sensing portions 136 and 137 may be provided at the entry side of the upper and lower rollers 120 and 130, at which wrinkles are frequently generated during the transfer of the base material 10.

In a case where a wrinkle is sensed by the receiving sensor 137, the control portion 300 controls the pressure control cylinder 140 for a certain period of time so that the pressure applied to the base material 10 by the upper and lower rollers 120 and 130 is decreased. In a case where the upper and lower rollers 120 and 130 transfer the base material 10 at a weak pressure while being continuously rotated, the wrinkle generated on the base material 10 is smoothed out.

According to at least one of the disclosed embodiments, meandering can be more precisely corrected.

Also, rollers for controlling meandering are driven at a line speed identical to the transfer speed of a base material, so that stress applied to the base material can be reduced in a transverse movement for controlling the meandering, thereby enhancing the quality of a secondary battery so manufactured.

While the disclosed embodiments have been described with reference to the accompanying drawings, it is to be understood that the disclosed embodiments are not considered limiting. The appended claims will cover various modifications and equivalent arrangements.

What is claimed is:

1. An apparatus for correcting a belt-meandering of a jelly roll wound at a high speed in a winding operation for a secondary battery, the apparatus comprising:
    upper and lower rollers configured to receive a base material therebetween, wherein the base material comprises positive and negative electrode materials and an insulating material interposed between the electrode materials;
    a driver portion configured to rotate the upper and lower rollers such that the base material is transferred in a first direction during the rotation;
    a support portion configured to support shafts of the driver portion and the upper and lower rollers;
    a transverse moving mechanism configured to move the support portion in a second direction substantially perpendicular to the first direction;
    an air pressure cylinder configured to control pressure applied to the base material by the upper and lower rollers;
    at least one wrinkle sensor configured to detect a wrinkle on the base material during the rotation; and
    a control portion configured to control the pressure cylinder based on the detected wrinkle for a certain period of time so as to decrease the pressure applied to the base material by the upper and lower rollers.

2. The apparatus according to claim 1, further comprising:
    a meandering sensor configured to detect a meandering of the base material,
    wherein the control portion is further configured to control the transverse moving mechanism based on the detected meandering to move the support portion in a direction in which the meandering of the base material is at least partially corrected.

3. The apparatus according to claim 2, wherein the control portion is configured to stop the transverse moving mechanism when no meandering of the base material is detected.

4. The apparatus according to claim 2, wherein the transverse moving mechanism comprises an electric motor controlled by the control portion and a ball-screw type moving mechanism configured to convert the rotation of the electric motor into a substantially linear motion.

5. The apparatus according to claim 2, wherein the meandering sensor is located adjacent to an exit side of the upper and lower rollers where the base material is received.

6. The apparatus according to claim 2, wherein the meandering sensor is configured to detect i) an occurrence of the meandering; ii) the direction of the meandering and iii) the degree of the meandering, and wherein the control portion is configured to control the transverse moving mechanism so as to move the support portion by the meandering degree in the opposite direction to the detected meandering direction.

7. The apparatus according to claim 2, wherein the meandering sensor is configured to detect i) an occurrence of the meandering and ii) the direction of the meandering, and wherein the control portion is configured to control the transverse moving mechanism based on the detected meandering direction so as to move the support portion in a direction in which the meandering is at least partially corrected.

8. The apparatus according to claim 1, wherein at least one of the upper and lower rollers has an outer surface treated so as to increase its frictional coefficient.

9. The apparatus according to claim 1, wherein a material having a high frictional coefficient is coated on outer circumferential surfaces of the upper and lower rollers.

10. The apparatus according to claim 1, wherein the wrinkle sensor is located adjacent to an entry side of the upper and lower rollers where the base material is received.

11. The apparatus according to claim 1, wherein the wrinkle sensor comprises a pulse laser transmitter configured to irradiate laser and a receiving sensor configured to receive the laser irradiated from the pulse laser transmitter.

12. An apparatus for correcting meandering of a base material while being transferred, the apparatus comprising:
    first and second rollers adjacent to each other and configured to receive the base material therebetween;
    a driver configured to rotate the rollers such that the base material is transferred in a first direction during the rotation;
    a transverse moving mechanism configured to move the rollers in a second direction substantially perpendicular to the first direction;
    an air pressure cylinder configured to control pressure applied to the base material by the upper and lower rollers;
    at least one wrinkle sensor configured to detect a wrinkle on the base material during the rotation; and
    a controller configured to control the pressure cylinder based on the detected wrinkle for a certain period of time so as to decrease the pressure applied to the base material by the first and second rollers.

13. The apparatus according to claim 12, wherein the apparatus is configured to correct a meandering of a jelly roll wound at a high speed in a winding operation for a secondary battery, and wherein the base material comprises positive and negative electrode materials and an insulating material interposed between the electrode materials.

14. The apparatus according to claim 12, further comprising a support structure accommodating shafts of the driver portion and the rollers, wherein the transverse moving mechanism is further configured to move the support structure in the second direction.

15. The apparatus according to claim 12, further comprising:
a meandering sensor configured to detect a meandering of the base material,
wherein the controller if further configured to control the transverse moving mechanism based on the detected meandering to move the support portion in a direction in which the meandering of the base material is at least partially corrected.

16. The apparatus according to claim 15, wherein the meandering sensor is configured to detect i) an occurrence of the meandering, ii) the direction of the meandering and iii) the degree of the meandering, and wherein the controller is configured to control the transverse moving mechanism so as to move the support portion by the meandering degree in the opposite direction to the detected meandering direction.

17. An apparatus for correcting meandering of a base material while being transferred, the apparatus comprising:
first and second rollers adjacent to each other and configured to receive the base material therebetween;
a driver configured to rotate the rollers such that the base material is transferred in a first direction during the rotation;
a transverse moving mechanism configured to move the rollers in a second direction substantially perpendicular to the first direction;
means for detecting at least one of 1) a meandering of the base material and 2) a wrinkle on the base material;
a controller configured to control the transverse moving mechanism based on the detection so as to move the rollers in a direction in which at least one of the meandering and wrinkle of the base material is at least partially corrected;
an air pressure cylinder configured to control pressure applied to the base material by the upper and lower rollers; and
at least one wrinkle sensor configured to detect a wrinkle on the base material during the rotation,
wherein the controller is configured to control the pressure cylinder based on the detected wrinkle for a certain period of time so as to decrease the pressure applied to the base material by the first and second rollers.

18. The apparatus according to claim 17, wherein the detecting means comprise:
a meandering sensor configured to detect a meandering of the base material during the rotation; and
the wrinkle sensor,
wherein the meandering sensor and wrinkle sensor are located on opposite sides of the rollers.

* * * * *